United States Patent
Kawai (10) Patent No.: US 6,240,358 B1
(45) Date of Patent: May 29, 2001

(54) TASK CONTROL METHOD WITH REDUCED STACKED MEMORY REQUIREMENT

(75) Inventor: Mitsuhiro Kawai, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/349,116

(22) Filed: Jul. 8, 1999

(30) Foreign Application Priority Data

Jul. 31, 1998 (JP) .................................. 10-217608

(51) Int. Cl.[7] .............................. F02D 43/04; G06F 13/26
(52) U.S. Cl. ......................... 701/114; 709/107; 710/264
(58) Field of Search .................................. 701/102, 115, 701/114; 709/103, 107; 710/264

(56) References Cited

U.S. PATENT DOCUMENTS

| | | | |
|---|---|---|---|
| 5,161,226 | * 11/1992 | Wainer | 710/264 |
| 5,490,064 | 2/1996 | Minowa | 701/1 |
| 5,875,341 | * 2/1999 | Blank et al. | 710/264 |

* cited by examiner

Primary Examiner—Andrew M. Dolinar
(74) Attorney, Agent, or Firm—Nixon & Vanderhye P.C.

(57) ABSTRACT

Task control via a multi-task or real time operating system that reduces the size of a RAM in which a stack region for processing the tasks, as well as an interrupt processing function, is set. An interrupt for interrupting any of a plurality of individual tasks having set priorities at a higher priority than the set priorities of the individual tasks is set. Thereafter, a stack region is set for processing the individual tasks and the interrupt in a writable and readable memory. The size of the stack region is then set to a size necessary for processing the individual tasks and in accordance with a task number, while a separate stack region is set for the interrupt.

13 Claims, 8 Drawing Sheets

TASK CONTROL METHOD WITH REDUCED STACKED MEMORY REQUIREMENT

CROSS-REFERENCE TO RELATED APPLICATION

The present invention is related to, and claims priority from, Japanese Patent Application No. Hei. 10-217608, the contents of which are incorporated herein by reference.

BACKGROUND OF THE INVENTION

1. Technical Field

The present invention relates to a task control methodology, more particularly, to a vehicle component task control method realized via a multi-task or real time operating system.

2. Related Art

As is well known, conventional vehicle engine control is performed by a single task construction realized by using a single task operating system, and real time control is realized via interrupt processing.

In accordance with the increasing complexity of engine control in recent years, however, it has become necessary to process a number of tasks (e.g., processes or jobs) and to define priorities for these numerous tasks. It has, therefore, been proposed to introduce a multi-task construction realized by using a multi-task real time operating system.

Figure 9:
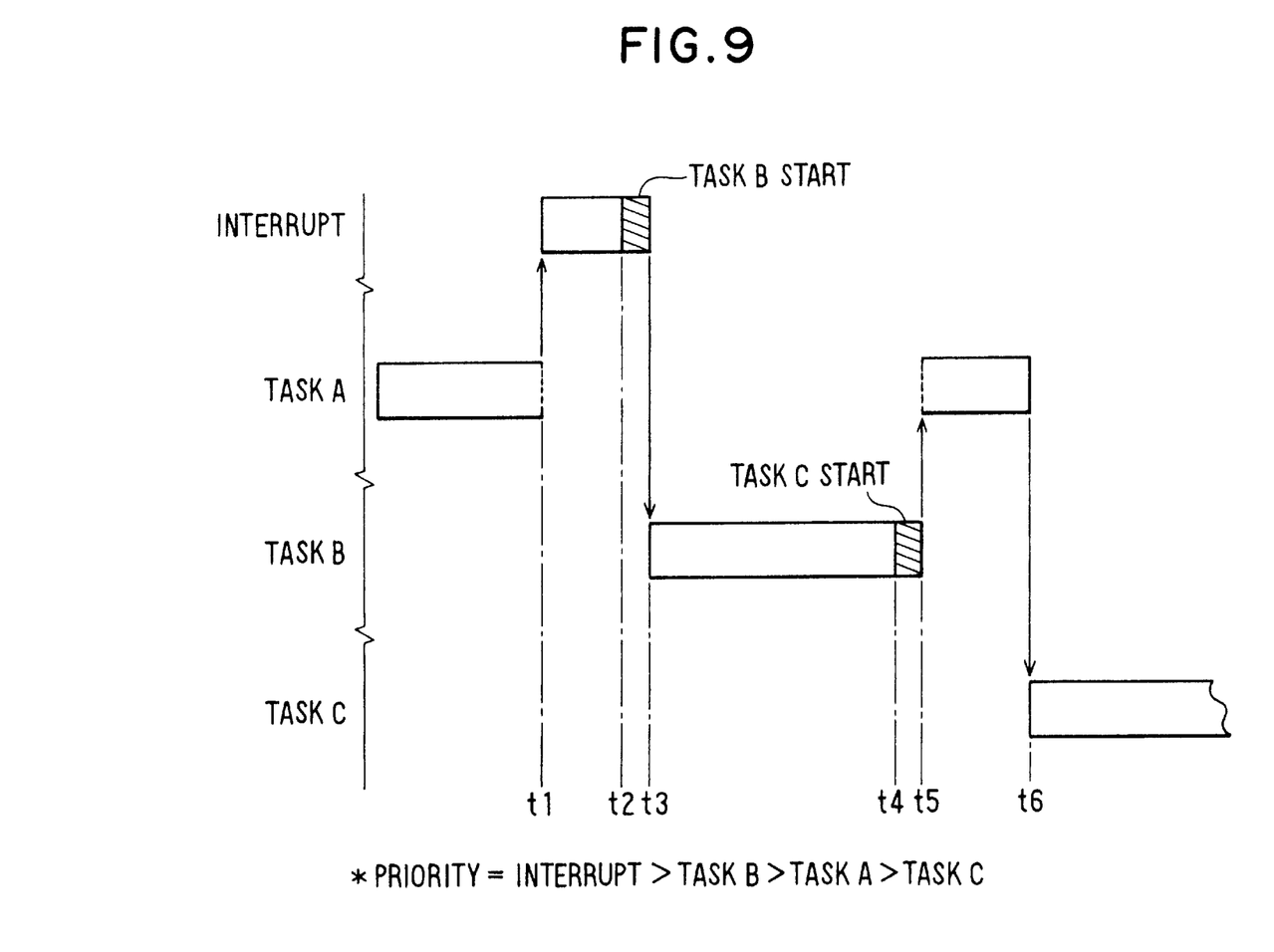
FIG. 9 is an explanatory diagram for explaining a routine for processing a plurality of tasks and an interrupt.

FIG. 9 is an explanatory diagram illustrating a processing routine in which three tasks A–C and an interrupt are to be processed through multi-task construction realized either by a multi-task or real time operating system.

Here in the individual tasks A–C, task B is set to have the highest priority whereas task C is set to have the lowest priority. The interrupt processing is set to have a higher priority than those of the individual tasks A–C. It is also set that the task changing routine is called to start task B after the end of the interrupt processing and to start task C after the end of task B.

This is exemplified by the time synchronized task (e.g., throttle valve control) for task A to be executed in synchronism with time, the rotation synchronized task (e.g., control of fuel injection rate or an ignition timing) for task B to be executed in synchronism with the rotation of the crank, and the rotation synchronized task (e.g., control of idle speed control valve) for task C to be executed in synchronism with the rotation of the crank.

When interrupt processing occurs at a time t1 in the processing of task A, the processing of task A is interrupted so that the interrupt processing of the highest priority is executed. When the interrupt processing is ended at time t2, moreover, a task changing routine is called to start task B so that task B is processed from time t3. After this, when the processing of task B is ended at time t4, the task changing routine is called to start task C. Since task A has a higher priority than that of task C, however, the remaining processing of task A is performed at time t5 subsequent to task B. When the processing of task A is ended at time t6, moreover, the processing of task C is performed.

The individual tasks A–C and the interrupt are processed in a stack region which is set in the RAM of the microcomputer located in the electronic control unit.

Figure 10:
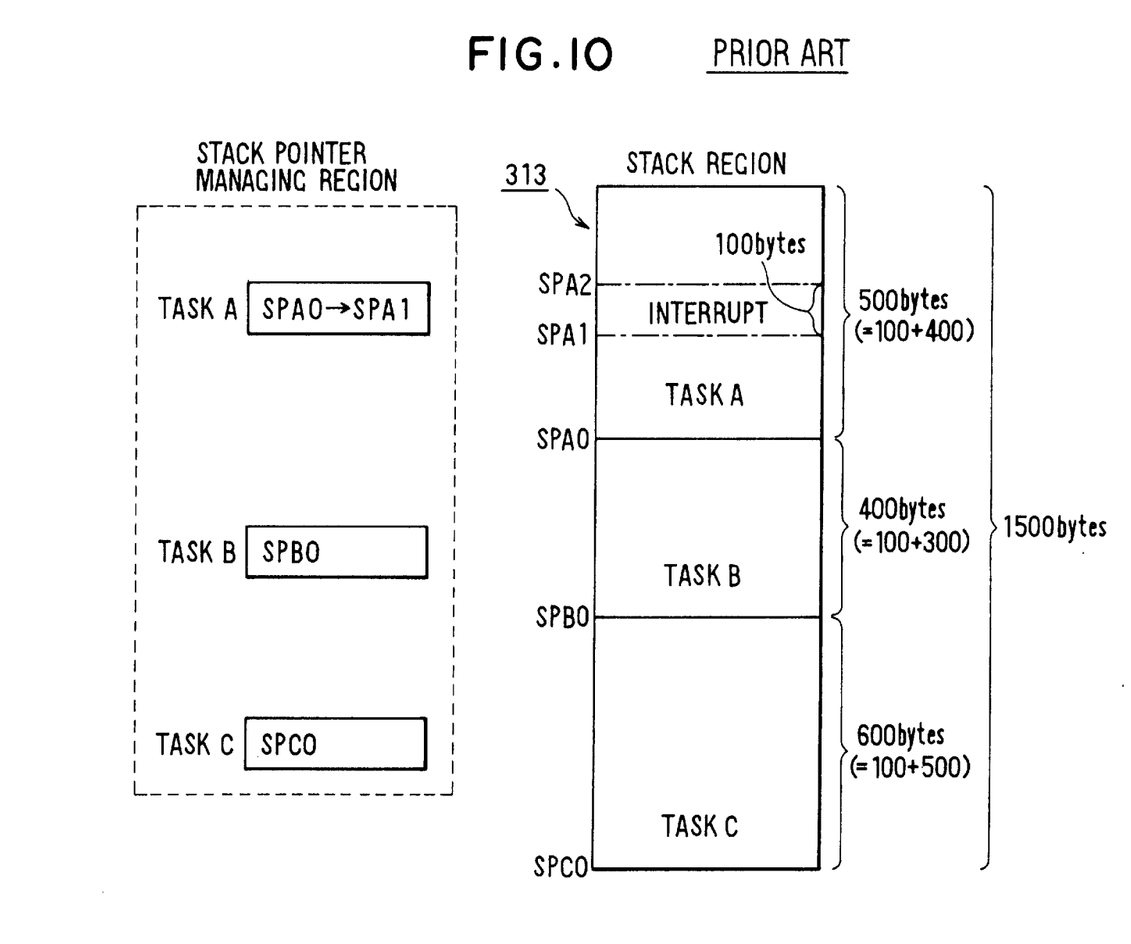
FIG. 10 is an explanatory diagram for explaining the construction of a task in the prior art.

FIG. 10 illustrates the construction of the stack region of the case in which the individual tasks A–C and the interrupt, as shown in FIG. 9, are processed. The RAM includes both a stack region and a stack pointer managing region are located. The stack region is a working region for processing the individual tasks A–C, and the interrupt and is provided for each of the individual tasks.

The stack pointer managing region is for latching and managing a stack pointer indicating the address of a region used for processing the individual tasks A–C in the stack region, and is provided for each of these individual tasks. Here, the occupation percentage of the stack pointer managing region in the RAM is so small that the RAM can be said to be substantially occupied by the stack region.

In an initial state, the value of the stack pointer of task A, as latched in the stack pointer managing region, is set to "SPA0"; the value of the stack pointer of task B, as latched in the stack pointer managing region, is set to "SPB0"; and the value of the stack pointer of task C, as latched in the stack pointer managing region, is set to "SPC0".

As a result, the processing of task A is started from the SPA0 of the stack region. Moreover, it is assumed that the value of the stack pointer advances to the "SPA1" at the instant (i.e., at the time t1 in FIG. 9) when the interrupt processing begins during the processing of the task A. Then, the interrupt processing is started from SPA1 of the stack region.

Moreover, it is assumed that the value of the stack pointer advances to "SPA2" at the instant (i.e., at the time t2 in FIG. 9) when the interrupt processing is ended. When the interrupt processing is ended, the stack pointer returns to SPA1 or the value at the instant when the processing of task A is interrupted, and the task changing routine is called to start task B. At this time, the value of the stack pointer of task A, as latched in the stack pointer managing region, is changed from the initial value SPA0 to the value SPA1 of the stack pointer at the instant the processing of the task A is interrupted. Then, the processing of task B is started (at the time t3 in FIG. 9) from the SPB0 of the stack region.

When the processing of task B is ended, the task changing routine is called so that task C is started (at time t4 in FIG. 9). Since task A has a higher priority than that of the task C, however, the remaining processing of interrupted task A is performed (at time t5 in FIG. 9). At this time, the stack pointer is shifted to SPA1 of task A, as latched in the stack pointer managing region, so that the remaining processing of task A is performed from the SPA1 of the stack region.

After this, when the processing of task A is ended, the stack pointer shifts to the SPC0 so that the processing of task C is started from the SPC0 of the stack region (at time t6 in FIG. 9).

Thus, when the interrupt processing comes in during the processing of task A, the working regions (SPA1 to SPA2) for the interrupt processing are stacked over the working regions (SPA0 to SPA1) of task A in the stack region, as has been used at that time for processing the task A.

This also applies to the case in which the interrupt processing comes in during the processing of task B or task C. In short, interrupt processing can occur during the processing of any of the individual tasks A–C. When the interrupt processing occurs during the processing of task B, therefore, the working region of the interrupt processing is stacked over the working region of task B in the stack region, as has been used at that time for processing task B. When the interrupt processing comes in during the processing of task C, on the other hand, the working region of the interrupt processing is stacked over the working region of task C in the stack region, as has been used at that time for processing task C.

Therefore, the sizes of the stack regions of the individual tasks A–C have to be set to the total of the sizes necessary for processing the tasks and the size necessary for the interrupt processing. As has been described, moreover, the size of the stack pointer managing region is so small that the size of the RAM is determined by the total of the sizes of the stack regions of the individual tasks A–C. In other words, the size of the RAM has to set to the total of the sizes necessary for processing the individual tasks A–C and the size necessary for the interrupt processing to be stacked over each of the stack regions of the individual tasks A–C.

For the case in which the size necessary for processing task A is 400 bytes, the size necessary for processing task B is 300 bytes, the size necessary for processing task C is 500 bytes, and the size necessary for interrupt processing is 100 bytes, the size of the stack region of task A is set to 500 (400+100) bytes, the size of the stack region of task B is set to 400 (300+100) bytes, and the size of the stack region of task C is set to 600 (500+100) bytes. This makes it necessary to set the size of the RAM to the total value of 1,500 (=500+400+600) bytes.

In the single task construction realized by using the single task operating system, on the other hand, no change can be made into another task before the task being processed is ended. When the individual tasks A–C and the interrupt are to be processed as described above by the single task construction, therefore, the size of the RAM may be set to the maximum of 600 bytes of the sizes of the stack regions of the individual tasks A–C (i.e., the size of the stack region of the task C).

In the multi-task construction realized by using the multi-task or real time operating system, as has been described, the size of the RAM is enlarged, because the size of the RAM has to be the total of the sizes necessary for processing the individual tasks, and the size necessary for processing the interrupt and stacked over each of the stack regions of the individual tasks.

SUMMARY OF THE INVENTION

In light of the above, it is an object of the present invention to reduce the size of a RAM in which a stack or working region for processing tasks and an interrupt are set, in a multi-task construction realized by using a multi-task or real time operating system.

More particularly, the present invention provides task control realized by using a multi-task or real time operating system. Moreover, interrupt processing to be executed by interrupting a plurality of tasks having priorities set is set to have a higher priority. A stack region is set as a working region for processing the individual tasks and the interrupt in a writable and readable memory. The stack region is set to a size necessary for processing the individual tasks and in accordance with the task number. An interrupt region is also set to a size necessary for interrupt processing, and is separate from the stack region for the individual tasks.

According to the invention, therefore, when the interrupt processing is activated during the processing of a task, the interrupt processing is performed in a preset stack region. Therefore, the size of the stack region for each task is only required to be the size necessary for processing the task. Moreover, the size of the memory is determined by the total of the sizes of the stack regions for processing the individual tasks and the interrupt.

In conventional multi-task control, when the interrupt processing is activated during task processing, the working area for the interrupt processing is stacked over the working region of the task in the stack region. This makes it necessary to set the size of the memory to the total of the sizes necessary for processing the individual tasks and for the interrupt processing to be stacked over the stack regions of the individual tasks.

In short, according to the present invention, the regions for interrupt processing are collected into one region so that memory size can be accordingly reduced.

DETAILED DESCRIPTION OF THE PREFERRED EMBODIMENTS

Figure 1:
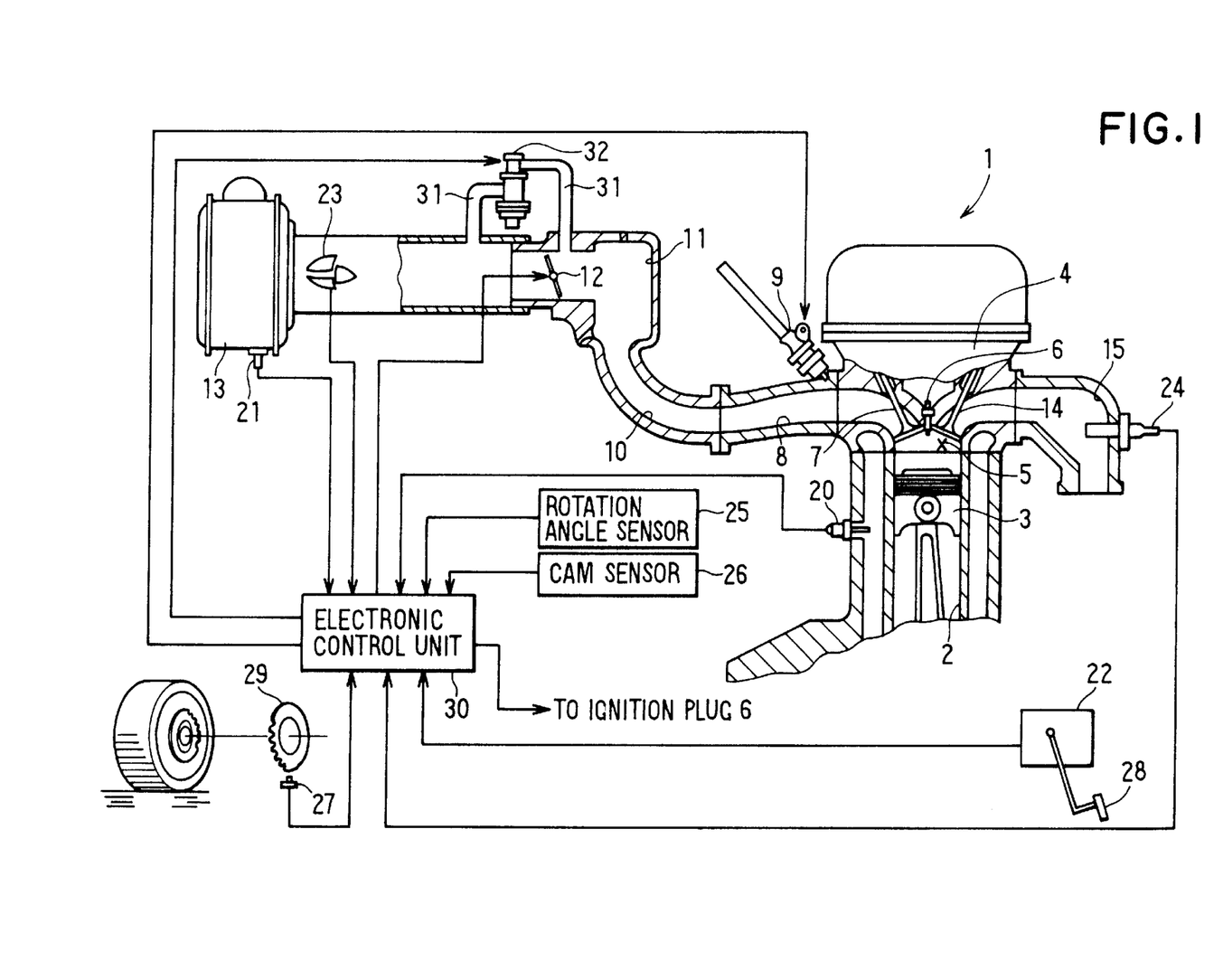
FIG. 1 block diagram showing a schematic construction of one embodiment according to the invention.

FIG. 1 is a schematic diagram of an engine controlled by an electronic control unit according to the present invention, as well as a peripheral system.

A spark ignition type five-cylinder gasoline engine 1 is equipped with a combustion chamber 5 defined by a cylinder 2, a piston 3 and a cylinder head 4. An ignition plug 6 of a built-in type coil is also arranged in the chamber 5. The engine 1 has an intake line composed of an intake manifold 8 communicating with the combustion chamber 5 through an intake valve 7, a fuel injection valve 9 for injecting fuel into the intake manifold 8, an intake pipe 10 communicating with the intake manifold 8, a surge tank 11 for absorbing pulsations of intake air, a throttle valve 12 for regulating an intake air flow, an air cleaner 13 for cleaning the dust of the intake air to be fed to the surge tank 11, a bypass conduit 31 bypassing the throttle valve 12 and providing communication between the upstream and downstream of the throttle valve 12, and an idle speed control valve (ISCV) 32 arranged in the bypass conduit 31.

The exhaust line of the engine 1 includes an exhaust manifold 15 that communicates with the combustion chamber 5 through an exhaust valve 14.

The engine also includes individual sensors 20–27. The water temperature sensor 20 is disposed in the cooling line of the engine 1 for detecting engine cooling water temperature. The intake air temperature sensor 21 is disposed in the air cleaner 13 for detecting the intake air temperature. The accelerator pedal sensor 22 is connected to an accelerator pedal 28 for detecting the depression rate of the accelerator pedal 28. The intake air flow sensor 23 is disposed upstream of the throttle sensor 12 for detecting the intake air flow. The oxygen concentration sensor 24 is disposed in the exhaust manifold 15 for detecting the residual oxygen concentration in the exhaust gas.

Also, the rotation angle sensor 25 detects the protrusion of a (60-2)-th tooth formed on the crank rotor (not-shown) to output a pulsating rotation angle detection signal at each 1/60 rotation of the (not-shown) crankshaft. Here, the 1/60 rotation of the crankshaft corresponds to an integer multiple as large as 6 degree crank angles (as will be designated by "degrees CA") of the 0 degree CA at the position where the protrusion of the (60-2)-th tooth is present and to an integer multiple as large as 18 degrees CA at the position (i.e., at the broken tooth position) where the protrusion of the (60-2)-th tooth is absent. The rotation angle sensor 25 also acts as a speed sensor of the engine 1.

The cam sensor 26 outputs a pulsating reference detection signal for cylinder discrimination at each rotation of the cam shaft (not-shown) (i.e., every two rotations of the crankshaft).

The vehicle speed sensor 27 detects the vehicle speed by detecting a protrusion of a signal rotor 29 mounted on a vehicle axle (not shown).

The detection signals of the individual sensors 20–27 are input to an electronic control unit 30. This electronic control unit 30 controls the engine 1 by controlling the ignition plug 6, the fuel injection valve 9, the throttle valve 12 and the ISCV 32 on the basis of the detection signals of the individual sensors 20–27.

Figure 2:
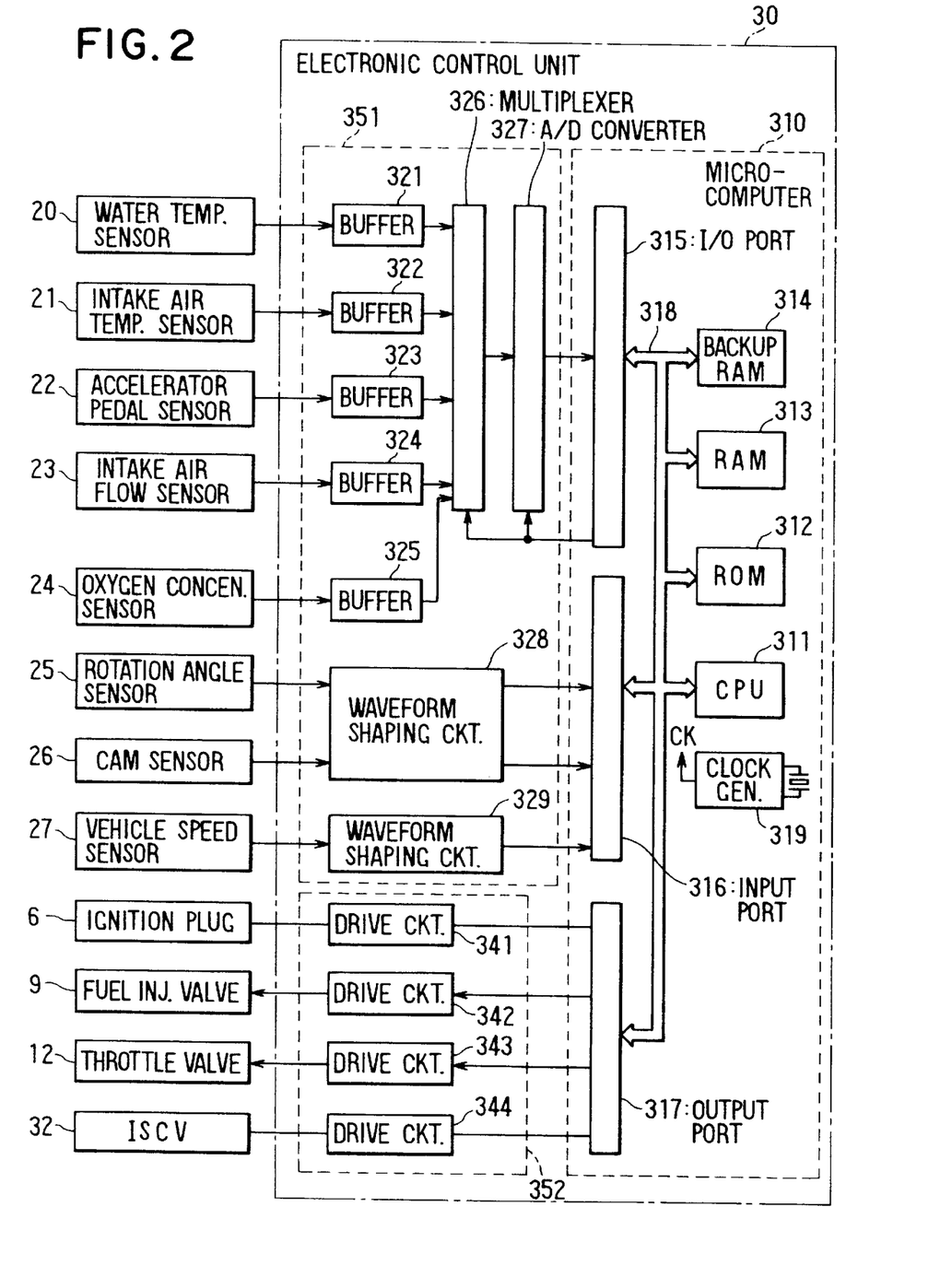
FIG. 2 is block diagram showing the internal construction of an electronic control unit of the embodiment.

As shown in FIG. 2, the electronic control unit 30 includes a microcomputer 310, a circuit portion 351 for pre-processing to fetch the detection signals of the individual sensors 20–27 in the microcomputer 310, and a circuit portion 352 for driving controlled components (of the ignition plug 6, the fuel injection valve 9, the throttle valve 12 and the ISCV32) in accordance with control commands generated by the microcomputer 310. Here, the electronic control unit 30 is supplied with power from a vehicle battery, when the key switch is turned ON.

The microcomputer 310 is composed of a CPU 311, a ROM 312, a RAM 313, a backup RAM 314, an input/output port 315, an input port 316, an output port 317, a common bus 318 and a clock generating circuit 319.

The CPU 311 inputs the detection signals of the individual sensors 20–27 from the input/output port 315 or the input port 316 through the common bus 318 in accordance with a control program (i.e., a multi-task or real time operating system) recorded in the ROM 312, generates control commands for driving the controlled components by executing predetermined operations based on the control program, and outputs the commands from the common bus 318 through the output port 317.

The control program may be recorded in a recording medium to be read by the computer, (e.g., a semiconductor memory, a hard disk, a floppy disk, a data card (IC card, a magnetic card or the like), an optical disk (CD-ROM, DVD or the like), a magneto-optic disk (MD or the like), a phase change disk or a magnetic tape) so that it may be used by starting the CPU 311, as loaded with it, if necessary.

The ROM 312 is stored in advance with the aforementioned control program, initial data or the like. The RAM 313 is set with a stack region and a stack pointer managing region for the later-described individual tasks A–C and the interrupt.

The backup RAM 314 latches various setting conditions for controlling the engine 1. Here, this backup RAM 314 is supplied with electric power directly from the vehicle-mounted battery, and not through the key switch, so that its latched content is retained even after the power supply from the vehicle-mounted battery to the electronic control unit 30 is interrupted by turning OFF the key switch.

The clock generating circuit 319 generates and feeds an operating clock CK to the individual components 311–317 of the microcomputer 310.

The circuit portion 351 is composed of individual buffers 321–325, a multiplexer 326, an A/D converter 327, and waveform shaping circuits 328 and 329. The multiplexer 326 selects the detection signals of the individual sensors 20–24, as input through the individual buffers 321–325, respectively in accordance with the command of the microcomputer 310.

The A/D converter 327 A/D-converts the detection signals of the individual sensors 20–24, as selected by the multiplexer 326 in accordance with the command of the microcomputer 310. The A/D-converted detection signals of the individual sensors 20–24 are output to the input/output port 315.

The waveform shaping circuit 328 shapes the waveforms of the detection signals of the rotation angle sensor 25 and the cam sensor 26 individually into binary pulse signal waveforms. The waveform shaping circuit 329 shapes the waveforms of the detection signal of the vehicle speed sensor 27 into a binary pulse signal waveform. The detection signals of the individual sensors 25–27 thus shaped are output to the input port 316.

The aforementioned circuit portion 352 is composed of individual drive circuits 341–344.

The drive circuit 341 controls the ignition timing of the ignition plug 6 by controlling the power supply to the coil built in the ignition plug, in accordance with the control command of the microcomputer 310.

The drive circuit 342 controls the fuel injection valve 9 to open for a predetermined time period in accordance with the control command of the microcomputer 310. This is so that the fuel pumped from the (not-shown) fuel pump to the fuel injection valve 9 may be injected from the fuel injection valve 9 at an injection rate corresponding to the open value time period to control the fuel injection rate.

The drive circuit 343 controls the intake air flow by controlling the degree of opening of the throttle valve 12 in accordance with the control command of the microcomputer 310.

The drive circuit 344 regulates the intake air flow to be fed to the engine 1 at the idle time to control the idle speed of the engine 1 to a predetermined value, by controlling the opening of the ISCV 32 in accordance with the control command of the microcomputer 310.

Figure 3:
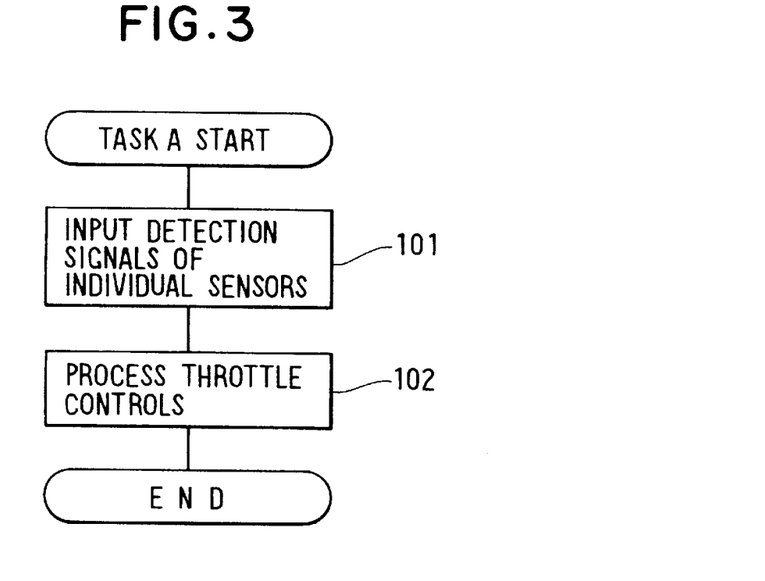
FIG. 3 is a low diagram for explaining the processing of a task A in the embodiment.

FIG. 3 is a flow diagram showing processing of the task A to be executed by the electronic control unit 30.

The time synchronized task or the task A is cyclically started (e.g., every 8 ms) in accordance with the control program (i.e., the multi-task or real time OS) recorded in the ROM 312.

First, the detection signals of the individual sensors 20–24, as input through the buffers 321–325, respectively, and selected by the multiplexer 326, are A/D-converted by the A/D converter 327 so that the converted signals of the individual sensors 20–24 are transferred from the input/output port 315 through the common bus 318 to the RAM 313 and the CPU 311 (Step 101). Next, by using the stack region of the task A set in the RAM 313 by the CPU 311 as the working region, the throttle controls are processed based on the detection signal of the accelerator pedal sensor 22. The control command of the throttle valve 12 is generated based on the processed result and is transferred from the common bus 318 through the output port 317 to the drive circuit 343 so that the throttle valve 12 is controlled by the drive circuit 343, thus ending the task A (Step 102).

Figure 4:
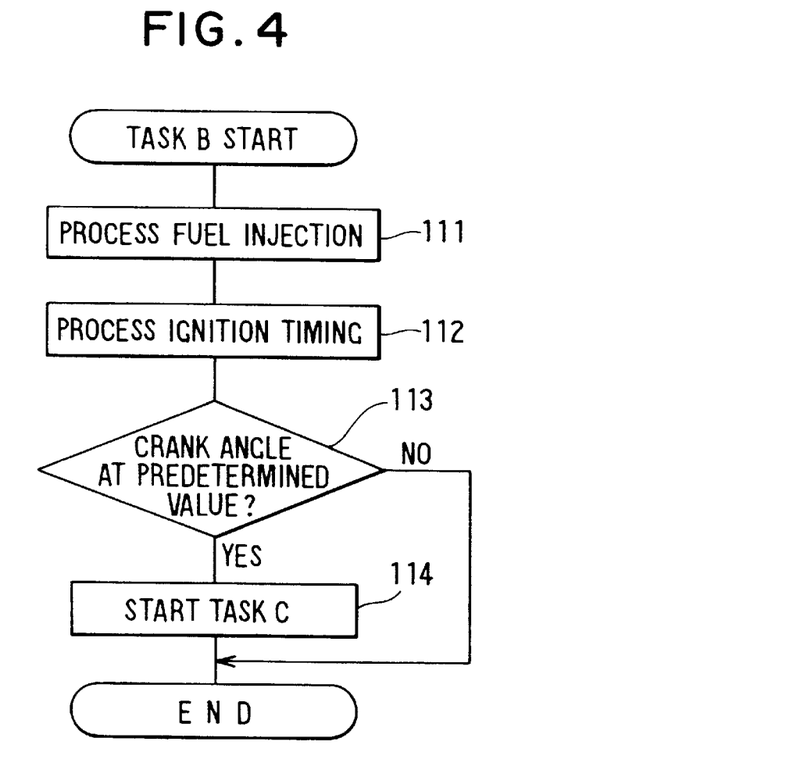
FIG. 4 is a flow diagram for explaining the processing of a task B in the embodiment.

FIG. 4 is a flow diagram showing the processing of task B to be executed by the electronic control unit 30.

Task B, or the rotation synchronized task, is cyclically started at predetermined crank angles (e.g., 36 degrees CA) of the crankshaft based on the detection signal of the rotation angle sensor 25 in accordance with the control program (i.e., the multi-task or real time OS) recorded in the ROM 312. On the other hand, task B is processed by using the stack region of task B, as set in the RAM 313 by the CPU 311, as the working region.

Initially, the fuel injection rate is processed based on the detection signals of the intake air flow sensor 23 and the rotation angle sensor 25 so that the control command of the fuel injection valve 9 is generated based on the processed result. This control command is transferred from the common bus 318 through the output port 317 to the drive circuit 342 so that the fuel injection valve 9 is controlled by the drive circuit 342 (Step 111).

Next, based on the detection signals of the intake air flow sensor 23 and the rotation angle sensor 25, the ignition timing of the ignition plug 6 is processed. The control command of the ignition plug 6 is generated based on the processed result and is transferred from the common bus 318 through the output port 317 to the drive circuit 341 so that the ignition plug 6 is controlled by the drive circuit 341 (Step 112).

Subsequently, it is decided based on the detection signal of the rotation angle sensor 25 (Step 113) whether or not the crank angle is at a predetermined value (e.g., 0 degrees CA). The process of task B is ended unless at the predetermined angle, and task C is started if at the predetermined value (Step 114). As a result, task C is started each time the crankshaft rotates through a predetermined crank angle. When task B is started at every 36 degrees CA, for example, task C is started at every 360 degrees CA.

Figure 5:
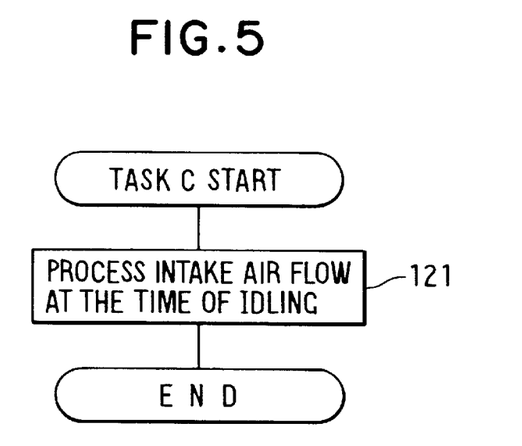
FIG. 5 is a flow diagram for explaining the processing of a task C in the embodiment.

FIG. 5 is a flow diagram showing the processing of task C to be executed by the electronic control unit 30.

Task C, or the rotation synchronized task, is processed by using the stack region of task C set in the RAM 313 by the CPU 311 as the working region.

The intake air flow to be fed to the engine 1 at the idle time is processed based on the detection signals of the intake air flow sensor 23 and the rotation angle sensor 25. The control command of the ISCV 32 is generated based on the processed result and is transferred from the common bus 318 through the output port 317 to the drive circuit 344 so that the ISCV 32 is controlled by the drive circuit 344 (Step 121).

Figure 6:
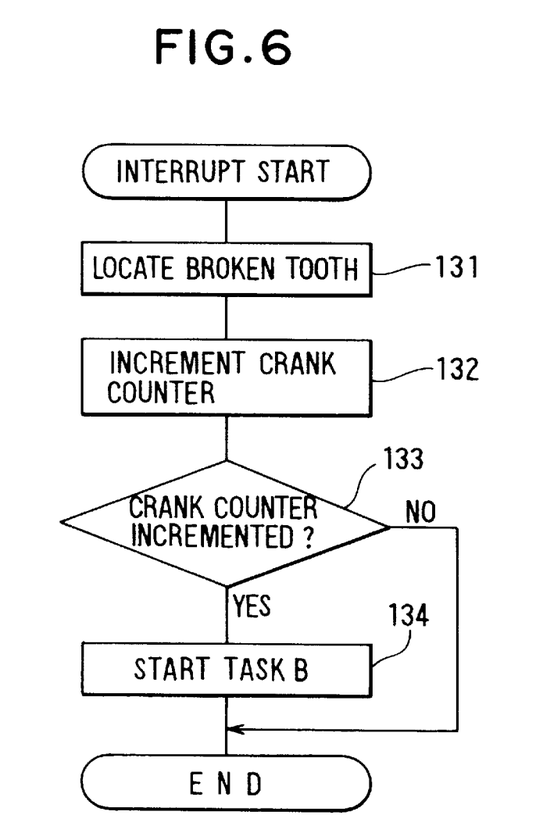
FIG. 6 is a flow diagram for explaining an interrupt processing in the embodiment.

FIG. 6 is a flow diagram showing processing of the interrupt to be executed by the electronic control unit 30. The interrupt is cyclically started at predetermined crank angles (e.g., 6 degrees CA at the position of no broken tooth and 18 degrees CA at the broken tooth position) of the crankshaft in accordance with the control program recorded in the ROM 312. On the other hand, the interrupt is processed by using the stack region of the interrupt, as set in the RAM 313 by the CPU 311, as the working region.

Initially, the broken tooth position is detected based on the detection signal of the rotation angle sensor 25 (Step 131). Next, the crank counter is incremented at predetermined crank angles (e.g., 36 degrees CA) (Step 132). Subsequently, it is decided from the preceding routine (Step 133) whether the crank counter is incremented. The interrupt is ended if not incremented, and task B is started if incremented (Step 134).

These tasks A–C are well known in the art. Task B is set to the highest priority whereas task C is set to the lowest priority, and the interrupt is set to a higher priority than those of the individual tasks A–C.

Figure 7:
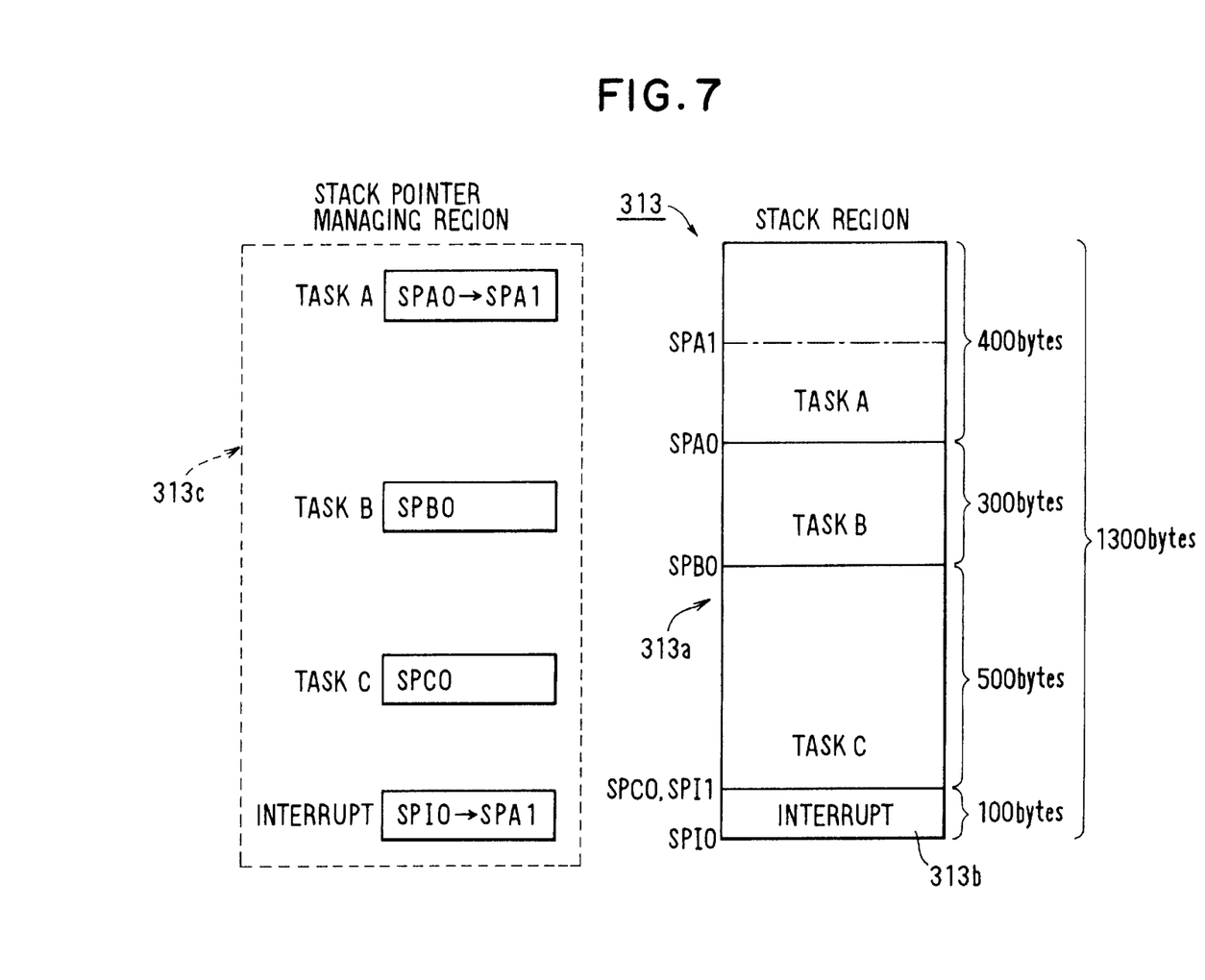
FIG. 7 is an explanatory diagram for explaining the construction of a stack in the embodiment.

FIG. 7 is an explanatory diagram for the construction of a stack in which the individual tasks A–C and the interrupt are to be processed in this embodiment by a multi-task construction realized by using the multi-task or real time OS.

The stack regions, as set in the RAM 313, are the working regions for processing the individual tasks A–C and the interrupt, and are provided with the interrupt processing stack region independently and in addition to the stack regions for the individual tasks A to C. The stack pointer managing region, as set in the RAM 313, is a region for latching and managing the stack pointer indicating the addresses of the regions used for the individual tasks A–C and the interrupt in the stack region, and is provided for not only processing each of the individual tasks A–C but also the interrupt. Here, the occupation percentage of the stack pointer managing region in the RAM 313 is so small that the RAM can be said to be substantially occupied by the stack region.

In this embodiment, the processing routine for processing the individual tasks A–C and the interrupt is identical to that of a conventional routine, as shown in FIG. 9. In the initial state, task A has a value "SPA0" of the stack pointer latched in the stack pointer managing region, task B has a value "SPB0" of the stack pointer latched in the stack pointer managing region, task C has a value "SPC0" of the stack pointer latched in the stack pointer managing region, and the interrupt has a value "SPI0" of the stack pointer latched in the stack pointer managing region.

Next, the task controlling operations by the electronic control unit 30 of this embodiment will be described with reference to FIGS. 7 and 9.

As shown in FIG. 7, the processing of task A is started from the SPA0 of the stack region. Moreover, it is assumed that the value of the stack pointer advances to "SPA1" at the instant (at the time t1 in FIG. 9) when the processing of task A is interrupted. Then, the value of the stack pointer to be latched in the stack pointer managing region for processing the interrupt is changed from the initial value SPI0 to the value SPA1 of the stack pointer at the instant which the processing of the task A is interrupted. Then, the stack pointer shifts to the SPI0 so that the interrupt is started from the SPI0.

It is then assumed that the value of the stack pointer advances to "SPI1 38 at the instant (at the time t2 of FIG. 9) when the interrupt was ended. When the interrupt is ended, the stack pointer returns to the SPI0. Then, the stack pointer shifts to the SPA1 latched in the stack pointer managing region for processing the interrupt.

The task changing routine is subsequently called so that the task B is started. At this time, the value of the stack pointer to be latched in the stack pointer managing region of the task A is changed from the initial value SPA0 to the value SPA1 of the stack pointer at the instant when the processing of the task A is interrupted.

The processing of the task B is then started from the SPB0 (at time t3 of FIG. 9).

When the processing of task B is ended, the task changing routine is called so that task C is started (at time t4 of FIG. 9). Since task A is higher in priority than task C, however, the remaining processing of the interrupted task A is performed (at the time t5 of FIG. 9) subsequent to task B. At this time, the stack pointer shifts to the SPA1, as latched in the stack pointer managing region of the task A, so that the remaining processing of the task A is performed from the SPA1 of the stack region. When the processing of the task A is ended, the stack pointer shifts to the SPC0 so that the processing of task C is started from the SPA1 of the stack region (at the time t6 of FIG. 9).

Figure 8:
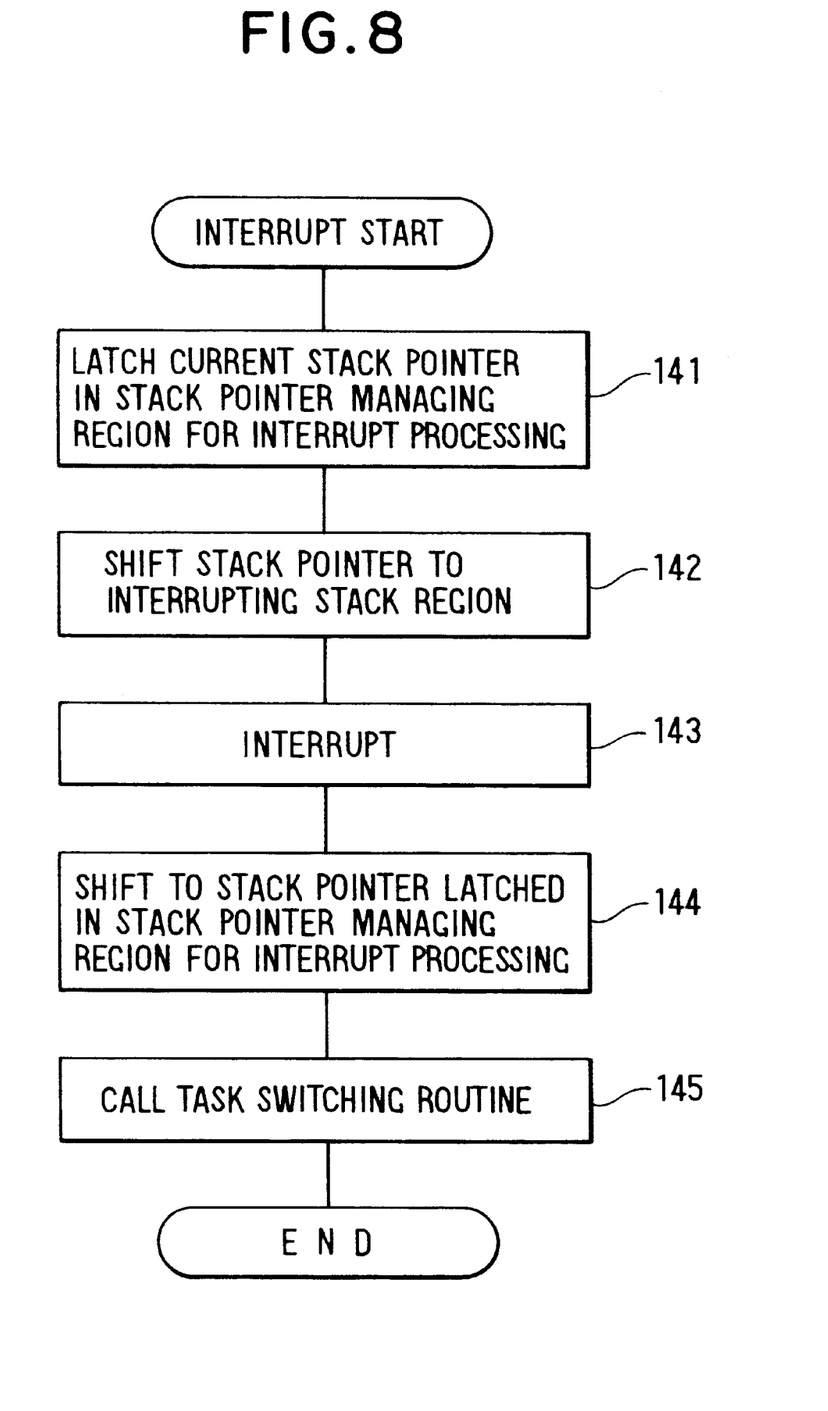
FIG. 8 is a flow diagram for explaining the interrupt processing in the embodiment.

FIG. 8 is a flow diagram showing the entire interrupt processing routine. When the interrupt processing is started, the value of the stack pointer, as latched in the stack pointer managing region for the interrupt processing, is changed at first to the SPA1 or the current value of the stack pointer (i.e., the value of the stack pointer at the instant when the processing is interrupted) (Step 141). Next, the stack pointer is shifted to the SPI0 of the stack region for the interrupt processing (Step 142) so that the interrupt processing is performed (Step 143). When the interrupt processing is ended, moreover, the stack pointer is moved to the SPA1 or the value of the stack pointer, as latched in the stack pointer managing region for the interrupt processing (Step 144). Subsequently, the task changing routine is called so that the task B is started (Step 145).

In FIG. 8, the steps of this embodiment, as added to conventional control methodology, are Steps 141, 142 and 144. In this embodiment, as has been described in detail, the interrupt is processed, if raised while task A is being processed, by the dedicated stack region set. in advance. This likewise applies to the case in which the interrupt rises while task B or task C is being processed.

Therefore, the sizes of the stack regions of the individual tasks A–C may be set to those necessary for processing the tasks. Moreover, the size of the stack pointer managing region is so small that the size of the RAM 313 is determined by the total of the sizes of the stack regions for the individual tasks A–C and the interrupt processing. In other words, the size of the RAM 313 may be set to the total of the sizes necessary for processing the individual tasks A–C and the size necessary for the interrupt processing.

In a case where the size necessary for processing the task A is 400 bytes, the size necessary for processing the task B is 300 bytes, the size necessary for processing the task C is 500 bytes, and the size necessary for the interrupt processing is 100 bytes, the size of the RAM may be the total value of 1,300 (400+300+500+100) bytes.

In the prior art shown in FIG. 10, however, the size of the RAM under identical conditions has to be at 1,500 bytes. According to this embodiment, therefore, the size of the RAM 313 can be made smaller by 200 (1,500–1,300) bytes than that of the prior art.

In the electronic control unit 30 for controlling the engine of the automobile, moreover, there is a limit to the size of the RAM 313 which can be mounted. However, with the present embodiment, the size of the RAM 313 can be reduced to provide a small size, low cost RAM for the electronic control unit 30.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. A method of controlling tasks performed by an operating system, said method comprising:
   setting an interrupt for interrupting any of a plurality of individual tasks by having a higher priority than set priorities of the individual tasks;
   setting a stack region as a working region for processing the individual tasks and the interrupt in a writable and readable memory, and at a size necessary for processing the individual tasks and in accordance with a task number;
   setting a region for the interrupt separate from the stack region in the writable and readable memory;
   setting a stack pointer managing region in the memory for each of the individual tasks and the interrupt;
   latching a value of a stack pointer in the stack pointer managing region for a task being processed when processing is interrupted; and
   shifting the stack pointer to the stack region for the interrupt to execute the interrupt.

2. The method of claim 1, further comprising:
   shifting the stack pointer to the value latched in the stack pointer managing region when the interrupt is ended; and
   calling a task changing routine set in the operating system to start a preset task.

3. The method of claim 2, wherein the calling comprises calling a new one of the individual tasks to be performed.

4. The method of claim 2, wherein the calling comprises calling the task being processed prior to the latching being initiated.

5. The method of claim 1, further comprising synchronizing each of the individual tasks via one of time synchronization and crank rotation synchronization.

6. The method of claim 1, wherein the control method is for a multi-task operating system.

7. The method of claim 1, wherein the control method is for a real time operating system.

8. The method of claim 1, wherein the method is for controlling operation of a vehicle engine, and the individual tasks are one or more of engine throttle control, fuel injection control, and idle time engine air flow intake.

9. A method to control a plurality of tasks for controlling a vehicle engine, comprising:
   setting a first region for processing the individual tasks in a writable and readable memory, and at a size necessary for processing the individual tasks and in accordance with a task number;
   setting a second region for an interrupt for interrupting a plurality of individual tasks by having a highest priority;
   setting a stack pointer managing region for each of the individual tasks and the interrupt, wherein said individual tasks control said vehicle engine;
   latching a value of a stack pointer in the stack pointer managing region for a task being processed when the task is interrupted;
   shifting the stack pointer to an interrupt processing stack region to perform the interrupt processing; and
   shifting the stack pointer back to the value latched in the stack pointer managing region when the interrupt processing is ended.

10. The method of claim 9, further comprising calling a task changing routine set in the operating system to start a preset task after shifting the stack pointer back to the value latched in the stack pointer managing region.

11. The method of claim 10, wherein the calling comprises calling a new one of the individual tasks to be performed.

12. The method of claim 10, wherein the calling comprises calling the task being processed prior to the latching being initiated.

13. The method of claim 9, further comprising synchronizing each of the individual tasks via one of time synchronization and crank rotation synchronization.

* * * * *